(12) United States Patent
Murasugi (10) Patent No.: US 6,361,472 B1
(45) Date of Patent: Mar. 26, 2002

(54) CONTROLLER FOR AN AUTOMATIC TRANSMISSION

(75) Inventor: Takashi Murasugi, Fuji (JP)

(73) Assignee: Jatco Transtechnology Ltd., Fuji (JP)

( * ) Notice: Subject to any disclaimer, the term of this patent is extended or adjusted under 35 U.S.C. 154(b) by 0 days.

(21) Appl. No.: 09/560,344

(22) Filed: Apr. 28, 2000

(30) Foreign Application Priority Data

Apr. 30, 1999  (JP) .......................................... 11-124979

(51) Int. Cl.⁷ ........................ F16H 61/00; F16H 61/26
(52) U.S. Cl. ...................................... 477/117; 477/138
(58) Field of Search ................................ 477/116, 117, 477/138, 155, 162, 163, 174, 180

(56) References Cited

U.S. PATENT DOCUMENTS

| | | | | |
|---|---|---|---|---|
| 4,224,842 A | * | 9/1980 | Rabus et al. ............. | 477/117 X |
| 4,487,303 A | * | 12/1984 | Boueri et al. ............. | 74/866 X |
| 4,757,886 A | * | 7/1988 | Brown et al. ................ | 192/3.3 |
| 5,107,723 A | * | 4/1992 | Yamashita et al. .......... | 477/117 |
| 5,249,483 A | * | 10/1993 | Iizuka ........................ | 477/117 |
| 5,385,511 A | * | 1/1995 | Iizuka ..................... | 477/117 X |
| 5,404,301 A | * | 4/1995 | Slicker .................... | 477/138 X |
| 5,612,874 A | * | 3/1997 | Schulz et al. ........... | 477/163 X |
| 5,813,943 A | * | 9/1998 | Kousaka et al. ......... | 477/155 X |
| 5,816,977 A | * | 10/1998 | Yasue et al. ................. | 477/138 |
| 5,957,808 A | * | 9/1999 | Iizuka ..................... | 477/117 X |
| 6,202,015 B1 | * | 3/2001 | Iizuka ..................... | 477/117 X |

FOREIGN PATENT DOCUMENTS

| | | |
|---|---|---|
| JP | 2-190666 | 7/1990 |
| JP | 7-139615 | 5/1995 |

\* cited by examiner

Primary Examiner—Charles A. Marmor
Assistant Examiner—Roger Pang
(74) Attorney, Agent, or Firm—Foley & Lardner (57) ABSTRACT

In gear-shift control performed during normal travelling, a drive frequency of each solenoid valve is set to a higher one to suppress fluctuations or changes of a quantity or speed of a flow of a hydraulic oil concerned when the solenoid current is turned on/off to suppress fluctuations of the output hydraulic pressure. In start selection, the drive frequency of the solenoid valve is set to a lower one to reduce the number of times a plunger and a ball hit each other within the solenoid valve to reduce a sound produced by the operation of the solenoid.

4 Claims, 9 Drawing Sheets

CONTROLLER FOR AN AUTOMATIC TRANSMISSION

BACKGROUND OF THE INVENTION

1. Field of the Invention

The present invention relates to controllers for automatic transmissions mounted on vehicles, and more particularly to improvements to vehicle start selection for an automatic transmission which duty-cycle controls its solenoid valves.

2. Background Art

One such conventional controller for an automatic transmission is disclosed, for example, in a published unexamined Japanese patent application 7-139615. In this controller, when start selection is made, for example, from an N-range to a D- or R- range, a drive frequency of respective solenoid valves which receive duty-cycle control is set to a value higher than those set in other gear shifting operations, for example in travelling, to thereby reduce an amplitude of vibrations of the hydraulic pressure produced in the solenoid valves and to restrict and prevent production of noise.

However, when a vehicle starts based on switching from the N-range to the D- or R-range, a transmission torque is generally small, for example, a hydraulic pressure required for each of the frictionally engageable elements is low, and a duty cycle for the respective solenoids is low. When the duty cycle is low, an output pressure from the solenoid valve is low, so that an amplitude of vibrations of the hydraulic pressure is small. Conversely, when the vehicle starts, it is at a zero speed where vehicle noise is very low. Thus, when the drive frequency of the solenoid valve increases, for example, the number of times a plunger and a ball hit each other within the solenoid valve increases, and its hitting energy is felt as a large operation sounds or noise. When, for example, the transmission torque is large and the oil pressure required for each frictionally engageable element is high a gear shift made while the vehicle is travelling, the duty cycle for each solenoid valve and vibrations of the hydraulic oil pressure can often be high. If the drive frequency of the solenoid valve decreases in such state where the vibrations of the hydraulic oil are high, fluctuations or changes of a quantity or speed of flow of the hydraulic oil increase, for example, when the solenoid is turned on and off increase. Thus, the vibrations of the hydraulic oil further increase. Those vibrations are transmitted as torque vibrations from the respective frictionally engageable elements to the vehicle and can be felt as abnormal sounds or vehicle body vibrations.

The present invention has been made in view of the above problems. It is therefore an object of the present invention to provide a control for an automatic transmission which restricts and prevents production of noise when the vehicle starts, and also which restricts and prevents production of abnormal sounds and vehicle body vibrations, for example, a gear shift made while the vehicle is travelling.

SUMMARY OF THE INVENTION

In order to achieve the above object, the present invention provides a controller for an automatic transmission for a vehicle comprising: start selection detecting means for detecting that start selection is made; and solenoid valve drive frequency changing means, responsive to the detecting means detecting that the start selection is made, for changing a drive frequency of a PWM (Pulse Wave Modulation) solenoid valve to a frequency lower than a drive frequency of the PWM solenoid valve used in gear shifting while the vehicle is travelling.

The start selection detecting means detects the range position of a shift lever which a driver manipulates and said start selection is to manipulate the shift lever to select a D range from a N range or a R range from the N range.

The duty cycle control referred to herein is to control a quantity of actuation of an electromagnetic (solenoid) valve or a quantity or speed of a flow of the hydraulic oil concerned by adjusting a duty cycle involving a so-called pulse width modulation. The start selection is to manipulate a select lever to select a D- or R- range from an N-range in a vehicle with an automatic transmission. The gear-shift in travel involves automatic gear-shift control provided depending on the vehicle speed or throttle opening.

DESCRIPTION OF THE PREFERRED EMBODIMENTS

Figure 1:
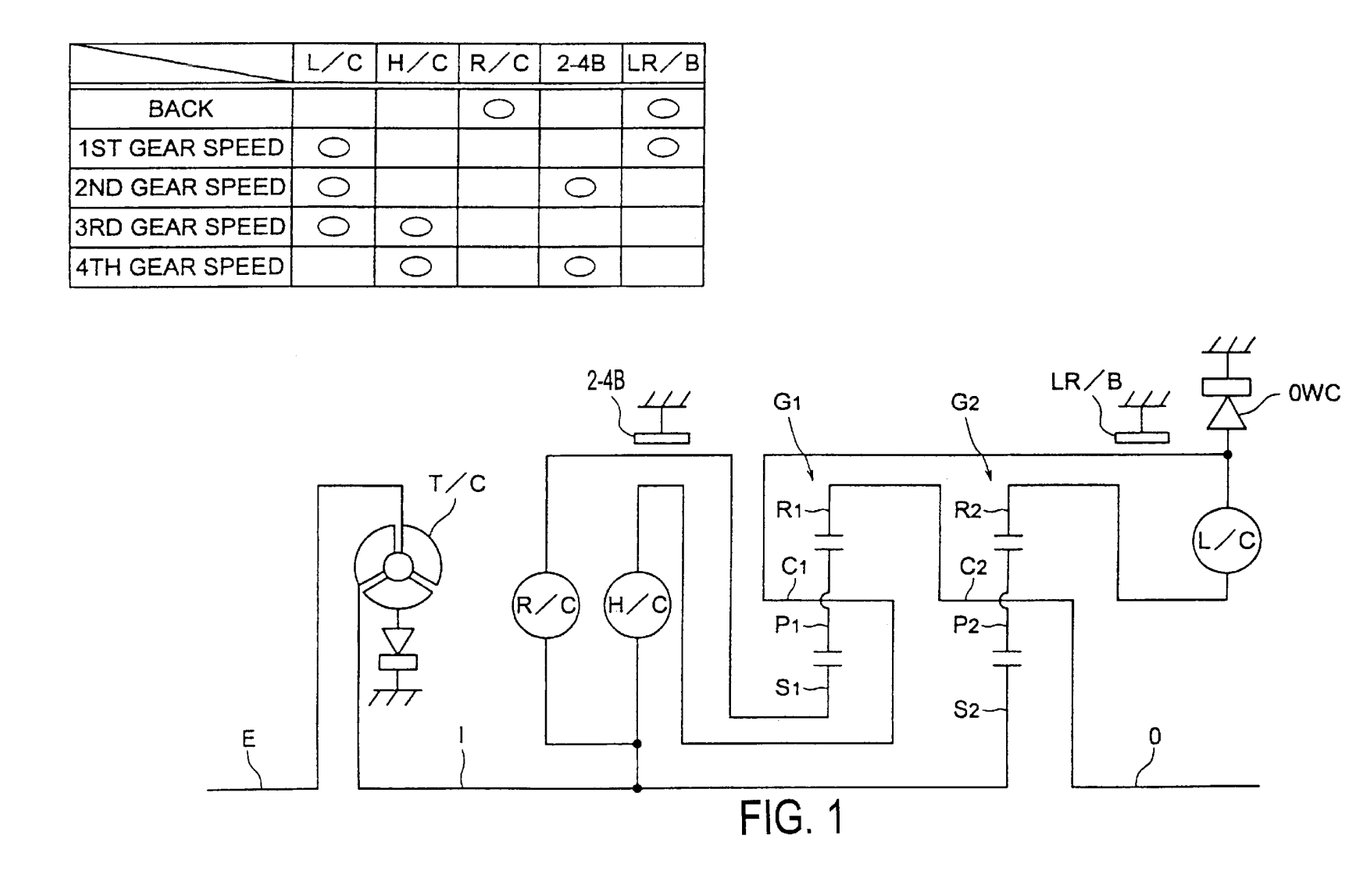
FIG. 1 shows one example of an automatic transmission in a skeleton form.

Preferred embodiments of a controller for an automatic transmission according to the present invention will be described with reference to the accompanying drawings. FIG. 1 shows an automatic transmission of one embodiment of the present invention in a skeleton form. The basic gear-shift structure of the automatic transmission includes two conventional planetary gear mechanisms which each include a sun gear, a pinion and a ring gear, one of which is locked or unlocked to change the ratio of input/output r.p.m. or a reduction ratio. The structure of the automatic transmission is well known, and names and symbols of its main structural elements only will be described herein. Reference symbol $G_1$ denotes the input-side planetary gear mechanism; $S_1$ a sun gear; $P_1$ a pinion; $R_1$ a ring gear; and $C_1$ a carrier. Reference symbol $G_2$ denotes the output-side planetary gear mechanism; $S_2$ a sun gear; $P_2$ a pinion; $R_2$ a ring gear; and $C_2$ a carrier. A reference symbol E denotes an output shaft of an engine connected to a pump impeller of a torque converter T/C; I an input shaft of the engine connected to a turbine liner of the torque converter T/C; and O an output shaft connected to drive wheels (not shown).

A high clutch H/C is provided between the carrier $C_1$ of the input-side planetary gear mechanism $G_1$ and the input shaft I. A one-way clutch OWC is provided between the carrier $C_1$ and the case. A low and reverse brake LR/B is provided outside a connection member for the carrier $C_1$ and the one-way clutch OWC. Likewise, a reverse clutch R/C is provided between the carrier $C_1$ of the input-side planetary gear mechanism $G_1$ and the input shaft I with a 2–4 brake 2–4B being provided outside a connection member for the carrier $C_1$ and the input shaft I. The ring gear $R_1$ of the input-side planetary gear mechanism $G_1$, the carrier $C_2$ of the output planetary gear mechanism $G_2$, and the output shaft O are together connected with the sun gear $S_2$ of the output-side planetary gear mechanism $G_2$ being connected with the input shaft I. A low clutch L/C is provided between the ring gear $R_2$ of the output-side planetary gear mechanism $G_2$ and the one-way clutch OWC. Thus, in this transmission, the reverse clutch R/C and the low and reverse brake LR/B are engaged together and the other frictionally engageable elements are disengaged when the vehicle moves back. At a first gear speed where the reduction ratio is maximum, the low clutch L/C and the low and reverse brake LR/B are engaged and the other frictionally engageable elements are disengaged. At a second gear speed of a lower reduction ratio, the low clutch L/C and the 2–4 brake 2–4B are engaged and the other frictionally engageable elements are disengaged. At a third gear speed of a further lower reduction ratio, the low clutch L/C and high clutch H/C are engaged and the other frictionally engageable elements are disengaged. At a fourth gear speed of a much lower transmission ratio, the high clutch H/C and the 2–4 brake 2–4B are engaged and the other frictionally engageable elements are disengaged.

Figure 2:
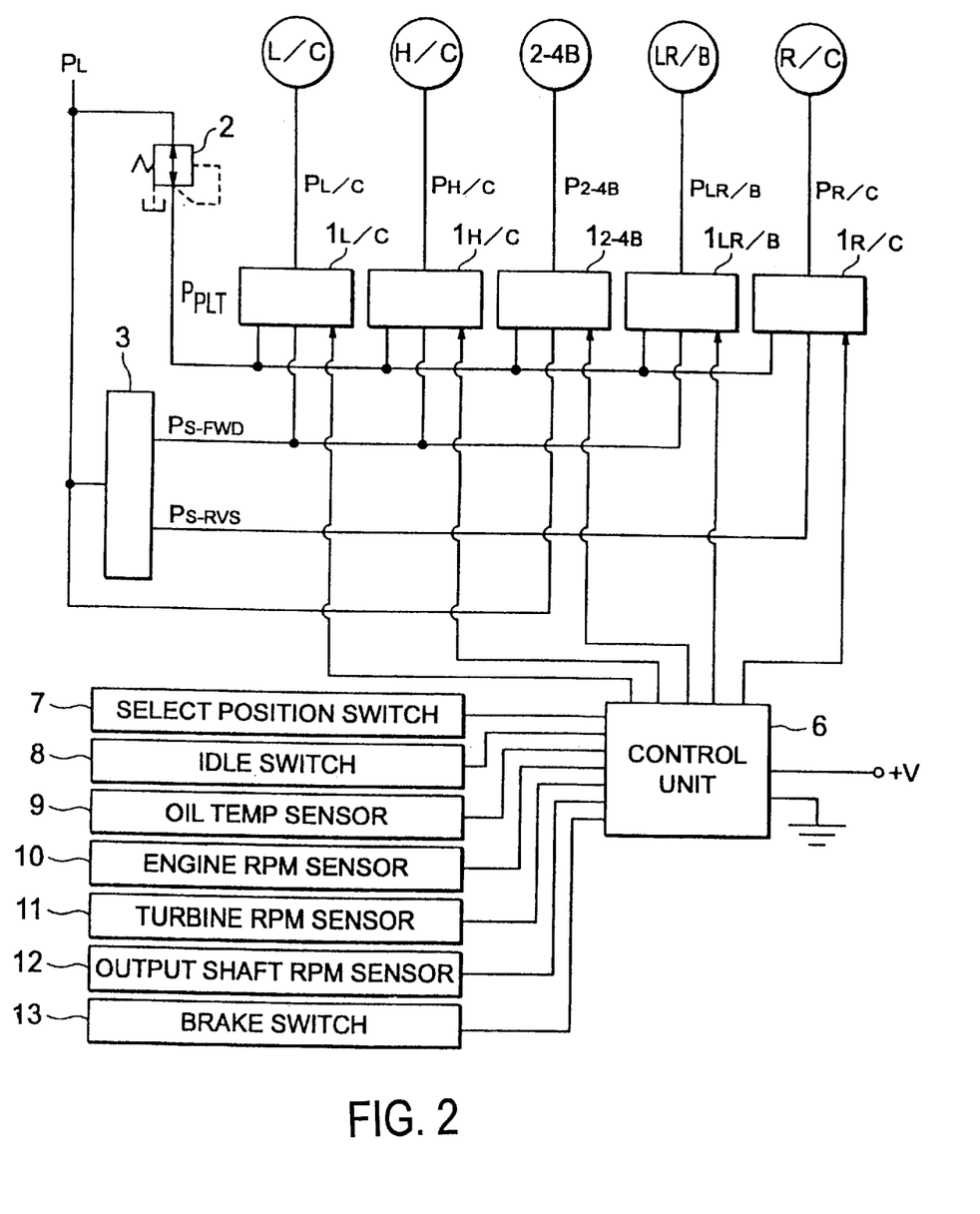
FIG. 2 is a circuit diagram of an actuator of the transmission shown in FIG. 1.

A common valve body is attached to a lower portion of a case of the transmission with an actuator unit being provided which is composed of various valves attached to the valve body. As shown in FIG. 2, the frictionally engageable elements L/C, H/C, 2–4B, LR/B, R/C are engaged/disengaged by hydraulic oils fed from the various pressure control valves $1_{L/C}$–$1_{R/C}$ provided within the actuator unit. The respective pressure control valves $1_{L/C}$–$1_{R/C}$ receive a pilot pressure $P_{PLT}$ branching through a pilot valve 2 from the original line pressure $P_L$ and spool feed pressures $P_{S-FWD}$ and $P_{S-RVS}$ branching from a manual valve 3, and adjust them and output the corresponding pressures to the respective frictionally engageable elements. The respective control valves excluding the reverse clutch pressure control valve $1_{R/C}$ are fed with a forward spool feed pressure $P_{S-FWD}$ branching from the manual valve 3, and the reverse clutch pressure control valve $1_{R/C}$ is fed with a backward spool feed pressure $P_{S-RVS}$. The spool feed pressures $B_{FWD}$ and $P_{S-RVS}$ are equal to the line pressure $P_L$.

Figure 3:
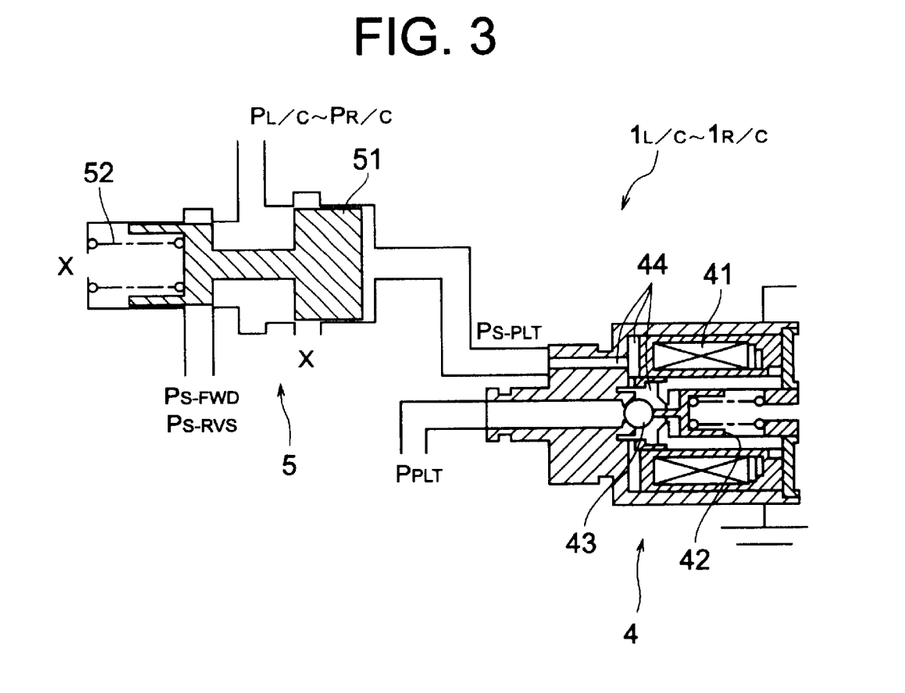
FIG. 3 shows a pressure control valve which controls a gear shift.

Each of the pressure control valves $1_{L/C}$–$1_{R/C}$ substantially has a composition of FIG. 3. More particularly, it includes a PWM (Pulse Wave Modulation) solenoid valve 4 which produces a spool pilot pressure $P_{S-PLT}$ from the pilot pressure $P_{PLT}$, and a spool valve 5 which outputs pressures $P_{L/C}$–$P_{R/C}$ fed to the frictionally engageable elements from the spool feed pressures $P_{S-FWD}$ and $P_{S-RVS}$ in accordance with the spool pilot pressure $P_{S-PLT}$. As is well known, in the solenoid valve 4, a quantity of movement of the plunger 42 increases as a quantity of a current fed to its coil increases such that, for example, a ball 43 which interrupts fluid communication between the pilot pressure side and the spool pilot pressure side is moved to open the oil path 44, and that the pilot pressure $P_{PLT}$ fluid communicates with the spool pilot pressure side to increase the spool pilot pressure $P_{S-PLT}$ The value of the current fed to the coil of the solenoid valve 4 is controlled by a drive signal from an automatic transmission control unit 6 to be described later. In this embodiment, duty cycle control is used which controls a width of a pulse voltage signal fed to the solenoid coil depending on a set duty cycle. A duty cycle (of 0–100%) represents a percentage of a pulse width of a pulse voltage signal occupied in a unit time. Thus, as a duty cycle increases, the value of the current fed to the solenoid valve coil increases generally. In this embodiment, simultaneously, the spool pilot pressure $P_{S-PLT}$ increases. The pulse voltage signal involved in the duty cycle has a high frequency, which is referred to as a high drive frequency. When the spool pilot pressure $P_{S-PLT}$ is absent in the spool valve 5, the return spring 52 presses the spool 51 so as to interrupt the spool feed pressure side from the respective frictionally engageable elements. In the spool valve 5, the spool 51 moves to open the oil path as the spool pilot pressure $P_{S-PLT}$ increases, and the spool feed pressures $P_{S-FWD}$ and $P_{S-RVS}$ increase pressures $P_{L/C}$–$P_{R/C}$ to be fed to the frictionally engageable elements. Thus, in this embodiment when the duty cycles for the solenoid valves 4 of the pressure control valves $1_{L/C}$–$1_{R/C}$ are high, the spool pilot pressure $P_{S-PLT}$ and the frictionally engageable element feed pressures $P_{L/C}$–$P_{R/C}$ increase linearly.

A throttle valve (not shown) is provided within an engine inlet pipe and opened/closed depending on a step-out quantity of an accelerator pedal by the driver. An idle switch (not shown) is attached to the throttle valve to detect that its opening is zero. An engine r.p.m. sensor 10 which senses the r.p.m. of the engine is attached to the output shaft E of the engine. An oil temperature sensor 9 which senses the temperature of the hydraulic oil contained within a reservoir (not shown) is provided on the actuator unit. A select position switch 7 is attached to a select bar (not shown) to select one of shift positions of the automatic transmission. The switch 7 detects a selected one of gear positions of the transmission and outputs a corresponding position signal. In more detail, those position signals correspond to actual select positions P, R, N, D, 2 and L of the transmission. A turbine r.p.m. sensor 11 which detects a turbine r.p.m. of the torque converter T/C is attached to the input shaft I of the transmission with an output shaft r.p.m. sensor 12 which senses the output shaft r.p.m. which is substantially equal to the vehicle speed being attached to the output shaft O. A brake switch 13 which is turned on when the brake pedal is stepped on is provided to the brake pedal.

Figure 4:
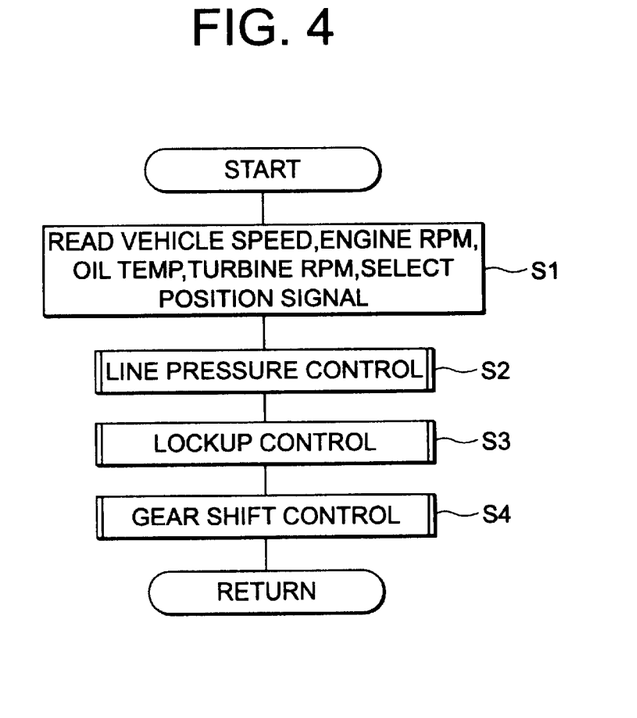
FIG. 4 is a flowchart showing general flow of gear-shift control performed by the control unit of FIG. 2.

The transmission control unit 6 includes a microcomputer which performs operations, for example, of FIG. 4, to output control signals to control the transmission and actuator unit, and a drive circuit which converts the control signals output from the microcomputer to drive signals suitable for the actual actuators or the respective solenoids. The microcomputer includes an input interface circuit, an operation unit, a memory, and an output interface. The respective drive circuits mentioned above convert a control signal output from the microcomputer to a drive signal suitable for driving a corresponding actuator.

The whole gear-shift control in the present embodiment will be outlined in accordance with a general flow of FIG. 4 performed by the microcomputer of the automatic transmission control unit 6. The operation of the general flow basically includes a brief outline of gear-shift control performed when no requests are made from the engine control unit (the details of such operation are disclosed, for example, in published unexamined Japanese patent application 2-190666). This operation is executed as timer interrupts occurring at predetermined sample intervals of time $\Delta T$ (for example, 10 msec). After this process, although no steps for communication are provided especially, programs, maps and/or data required by an operation unit of the microcomputer are read out from the memory as requested, and conversely, data calculated by the operation unit should replace the data stored in the memory as requested.

In this operation, first, in step S1 a vehicle speed $V_{SP}$ from the output shaft r.p.m. sensor 12, an engine r.p.m. $N_E$ from the engine r.p.m. sensor 10, a hydraulic oil temperature TMP from an oil temperature sensor 9, a turbine r.p.m. $N_I$ from the turbine r.p.m. sensor 11, and a select position signal $S_{RANGE}$ from the select position switch 7 are read.

Figure 5A:
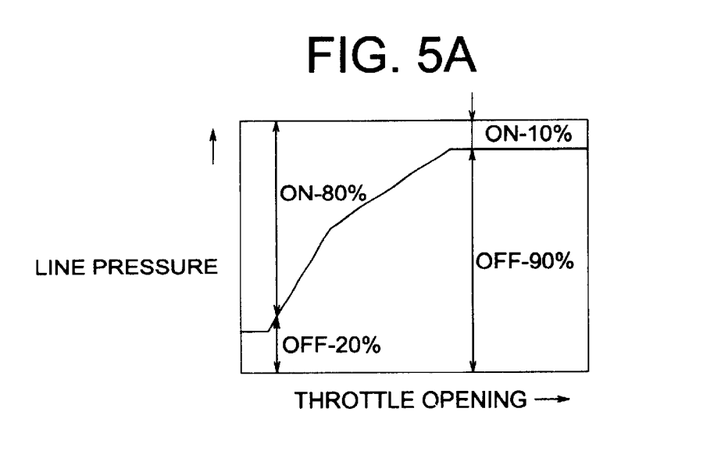
FIG. 5A shows a control map used in the operation of FIG. 4.
Figure 5B:
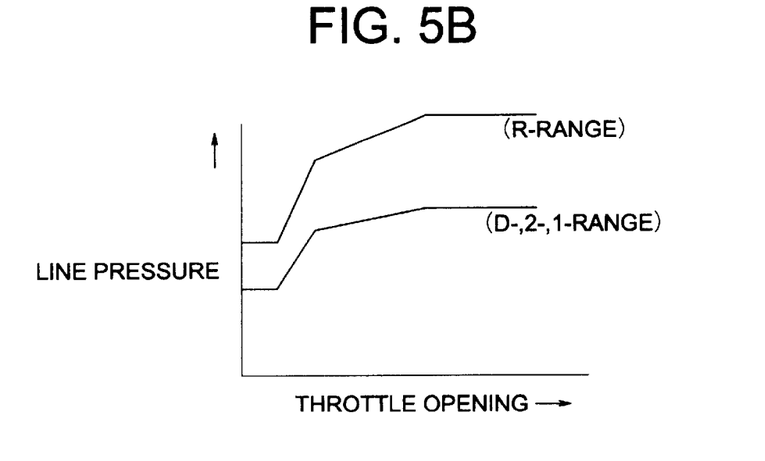
FIG. 5B shows another control map used in the operation of FIG. 4.

Then, in step S2 the line pressure $P_L$ is controlled in accordance with a respective operation such as control map retrieval. More specifically, a line pressure $P_L$ is set in accordance with a throttle opening-line pressure curve of FIG. 5A. The line pressure $P_L$ includes an actuating hydraulic pressure for sufficiently engaging frictionally engageable elements such as the respective clutches in response to an input torque from the engine and for minimizing a pump loss. Thus, the line pressure $P_L$ required in the R-range is different from that required in the D-, 2-, or L-range, where the transmitting direction of the engine torque in the R-range is different from that in the D-, 2- or L-range, as shown in FIG. 5B. A target line pressure $P_{LO}$ is calculated by correcting the line pressure $P_L$ based on gear-shift and/or temperature of the hydraulic fluid, a line pressure control duty cycle for achieving the target line pressure $P_{LO}$ is calculated and set, and a corresponding line pressure control signal is produced and output to the line pressure control solenoid valve.

Then, in step S3 lockup control is performed in accordance with a respective operation. More specifically, a lockup vehicle speed and an unlockup vehicle speed are set depending on the vehicle speed and throttle opening. A control signal is produced and output as a rule such that if the vehicle speed is higher than a lockup one, the vehicle is locked up and that if the vehicle speed is below a unlockup one, the vehicle is unlocked. Especially, when the vehicle speed shifts to the lockup one, the clutch is placed temporarily in a half-clutch state to thereby alleviate possible shocks which would arise when the vehicle shifts to a complete lockup state.

Then, in step S4 gear-shift ratio control is performed in accordance with a respective operation, and then the control returns to the main program.

Figure 6:
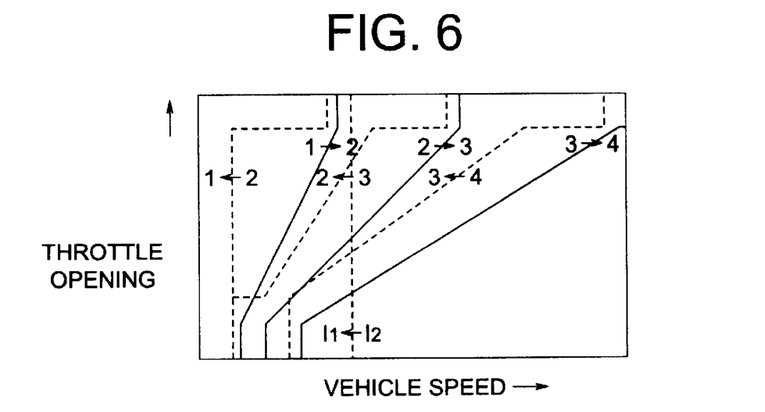
FIG. 6 shows still another control map used in the operation of FIG. 4.

The gear-shift control will be outlined with reference to FIG. 6 which shows one of automatic gear-shift curves in a general travel. In this control map, an appropriate target gear-shift ratio or stage is set based on the vehicle speed and throttle opening concerned. In FIG. 6, gear-shift stages "1", "2", . . . correspond to a first gear speed, a second gear speed, . . . , respectively, and the respective frictionally engageable elements are engaged/disengaged so as to achieve a target gear-shift ratio in the gearshift stage.

This automatic transmission curve involves normal travelling of the vehicle when a select position D selected by the select lever is in the D-range. When the select position is in a different range, for example, in the 2- or L-range, another control map is used. Similarly, in the R-range, the back gear-shift ratio is constant even when the vehicle speed changes. In the N-range, all the frictionally engageable elements are disengaged. Thus, when the select position is changed, for example, from the N-range to the D- or R-range, in a stop state of the vehicle, a gear-shift stage corresponding to the vehicle state at that time is set and frictionally engageable elements corresponding to the gearshift stage are engaged. Those gear-shift ratio controls are performed in accordance with respective corresponding operations (not shown) as requested.

Figure 7:
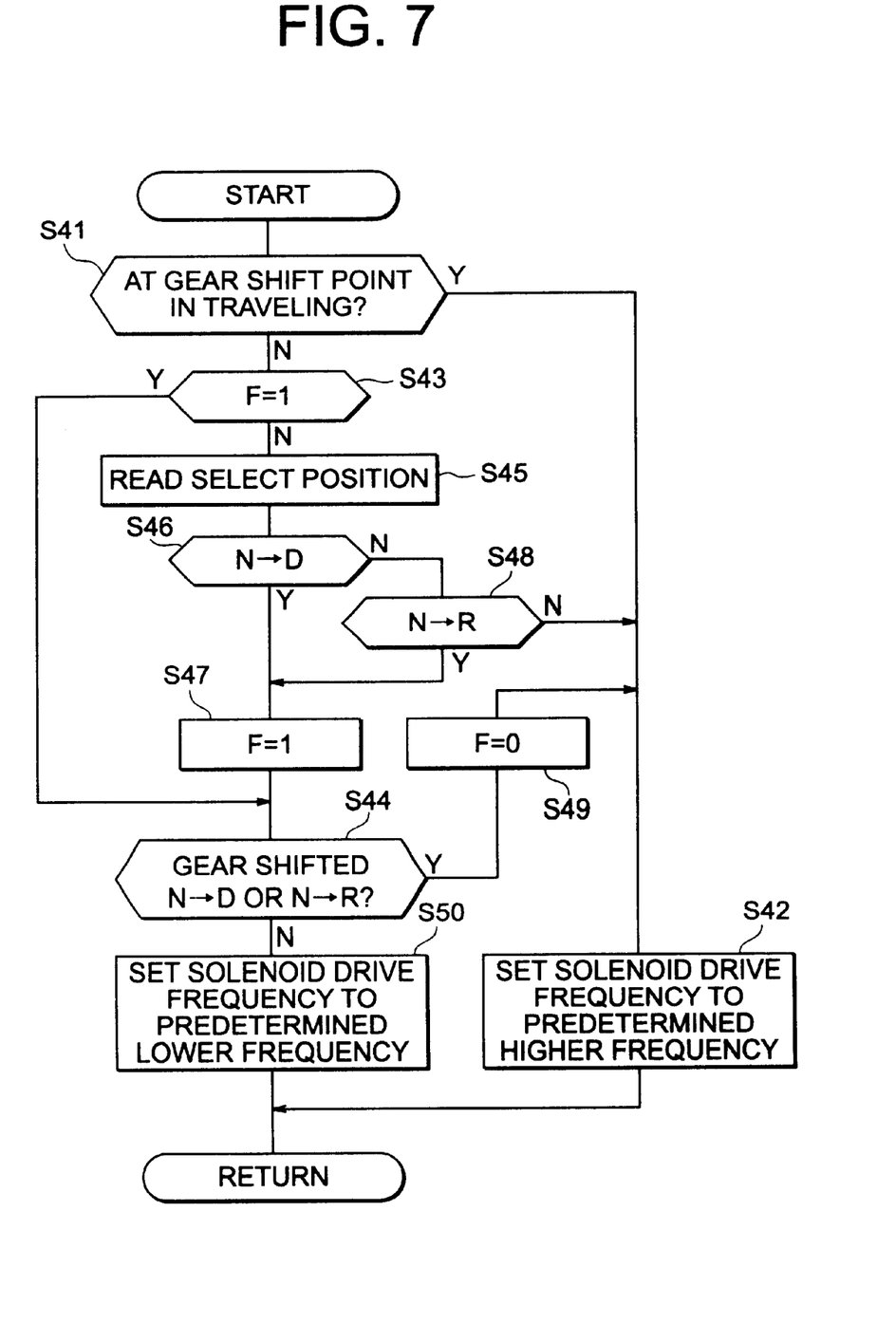
FIG. 7 is a flowchart of one embodiment of the invention executed as a minor program of the operation of FIG. 4.

FIG. 7 shows a process for setting the drive frequencies of the solenoid valves of the respective pressure control valves, for example, performed at a cycle similar to that of the gear-shift ratio control subsequently to the gear-shift ratio control process. In this process, it is first determined in step S41 whether a gear-shift is required now (a gear-shift point in FIG. 7) in the normal travelling. If it is, the control passes to step S42. If otherwise, the control passes to step S43.

In step S43, it is determined whether a control flag F for setting the solenoid drive frequency to a higher frequency is set to 1. If it is, the control passes to step S44. If otherwise, the control passes to step S45.

In step S45, a select position $S_{RANGE}$ sensed by the select position switch 7 is read and then the control passes to step S46.

In step S46, it is determined whether the preceding read select position $S_{RANGE}$ is in the N-range and whether the now read select position $S_{RANGE}$ is in the D-range, that is, whether the gear change includes the start selection from the N-range to the D-range. If it is, the control passes to step S47. If otherwise, the control passes to step S48.

In step S48, it is determined whether the preceding read select position $S_{RANGE}$ is in the N-range and whether the now read select position $S_{RANGE}$ is in the R-range, that is, whether the gear shift includes selection of a start of the vehicle from the N-range to the R-range. If it is, the control passes to step S47. If otherwise, the control passes to step S42.

In step S47, the control flag F is set to 1 and then the control passes to step S44.

In step S44, it is determined whether gear-shift control for start selection from the N-range to the D- or R-range has been terminated. If it is, the control passes to step S50. If otherwise, the control passes to step S49.

In the step S49, the control flag F is reset to 0 and the control passes to S42.

Then, in step S42 the drive frequency of the solenoid valves of the respective pressure control valves is set to a preset predetermined lower frequency and the control then returns to the main program.

Then, in step S50 the drive frequency of the solenoid valves of the respective pressure control valves is set to a preset predetermined higher frequency and the control then returns to the main program.

Thus, in this process, the control flag F is set to 1 until start selection is performed from the N-range to the D- or R-range in a stop state of the vehicle and then gear-shift depending on the state of the vehicle at that time is terminated, while when the control flag F has been set, the solenoid drive frequency is set to the predetermined low frequency.

An example of this process will be described next.

Figure 8:
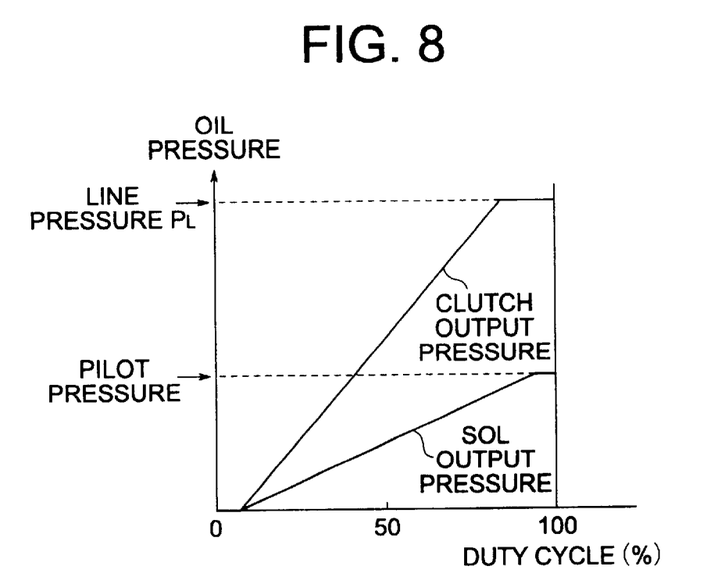
FIG. 8 shows output characteristics of a solenoid valve and a pressure control valve.

The pressure control valve of FIG. 3 has an oil pressure output characteristic, for example, as shown in FIG. 8. As the duty cycle for control of the solenoid valve increases, a quantity of a current fed to the coil and hence a quantity of movement of the plunger increase, which gradually increases the output pressure (shown as SOL pressure in FIG. 8) from the solenoid valve and hence the output pressure (shown as clutch pressure in FIG. 8) applied to the respective frictionally engageable elements gradually increase.

Figure 9:
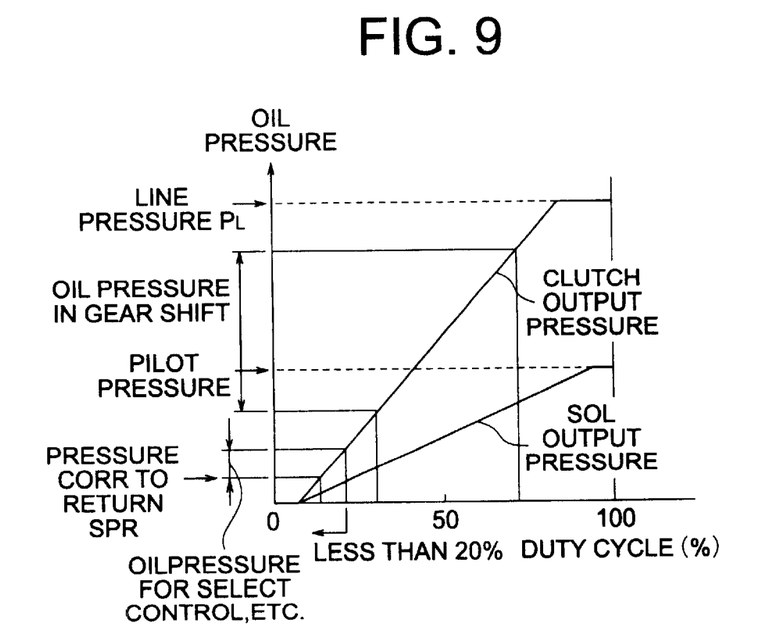
FIG. 9 shows the output characteristics of FIG. 8 and oil pressure characteristics for gear shift in normal travelling and start selection.

Output (oil) pressures required for the respective frictionally engageable elements will be considered next when the line and pilot pressures are constant, for example. Since the transmission torque is large in the gear-shift control performed during normal travelling of the vehicle, the oil pressures required for the respective frictional elements are large, of course. In contrast, when the vehicle starts, its speed is about 0 and the transmission torque is low, so that the oil pressures required for the respective frictionally engageable elements are low. FIG. 9 shows curves representing those oil pressures written onto the oil pressure characteristics of FIG. 8. It will be seen in FIG. 9 that the duty cycle of the solenoid valves which produce oil pressures required for the start selection is very low compared to that of the solenoid valves which produce oil pressures required for gear-shift control in the normal travelling of the vehicle; for example, not more than about 20% in this case.

Figure 10:
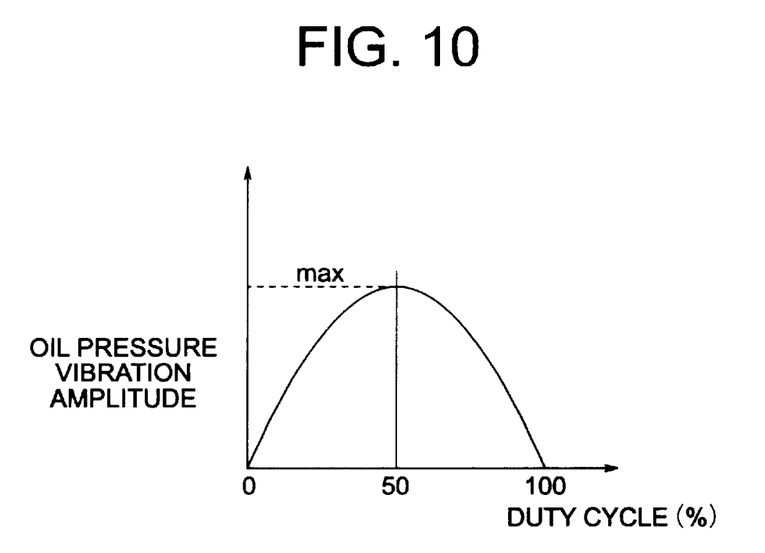
FIG. 10 shows the relationship between solenoid valve duty cycle and resulting oil pressure vibration amplitude.
Figure 11:
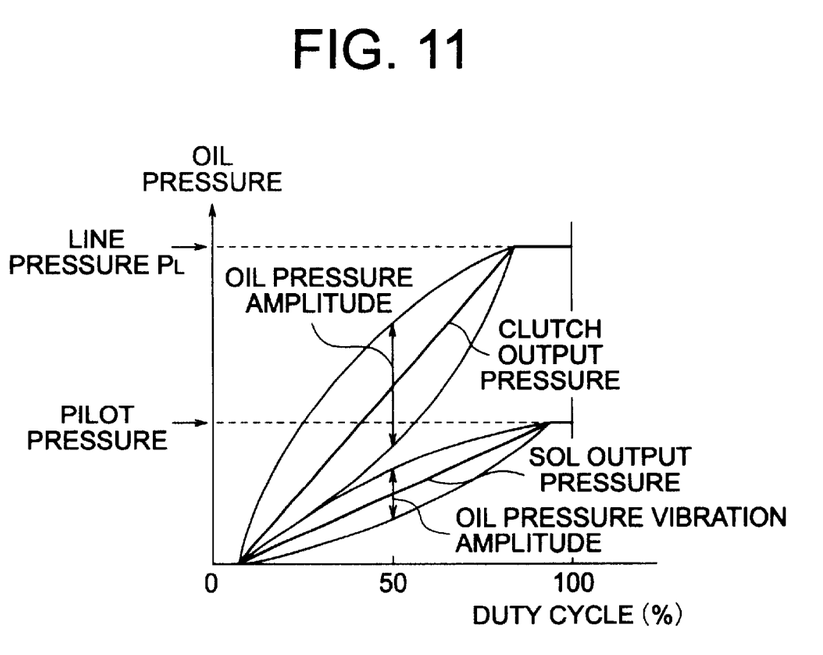
FIG. 11 shows the output characteristics of FIG. 8 and oil pressure vibration amplitude characteristics.

The relationship between a duty cycle of a general solenoid valve and an amplitude of oil pressure vibrations of the output pressure is shown in FIG. 10. In this case, the oil pressure vibration amplitudes are small when the duty cycles are 0 and 100% and the amplitude is maximum when the duty cycle is 50%. When this characteristic overlaps with the oil pressure characteristics of FIG. 8, vibrations of the oil pressure (amplitude) are represented as shown in FIG. 11. It will be seen from comparison of this oil pressure vibration characteristic with oil pressures required when the vehicle travels normally and when the start selection is made that if the duty cycle of the solenoid valves is small when the start selection is made, the oil pressure vibration amplitude of the output pressure is small, of course. Conversely, during the normal travelling, the duty cycle of the solenoid valves increases and hence the oil pressure vibration amplitude of the output pressure is likely to increase.

Figure 12A:
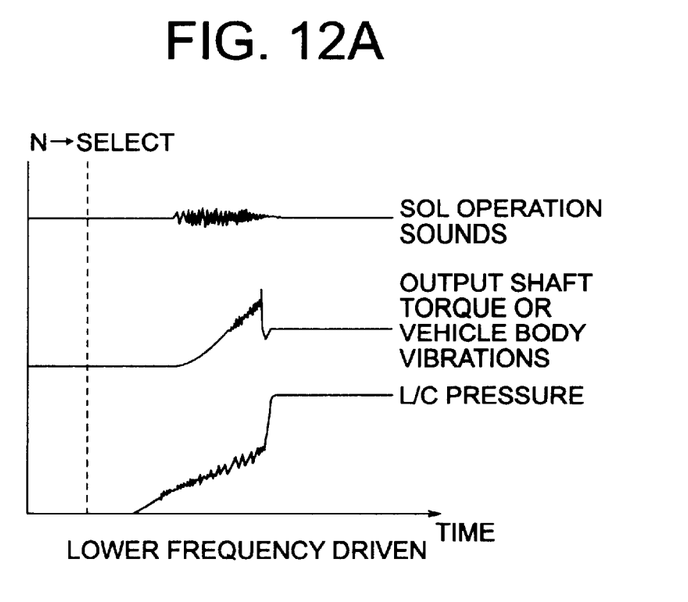
FIG. 12A shows an influence of operation of FIG. 7.

In addition to such output pressure characteristics and oil pressure vibration characteristics, in the present embodiment each solenoid drive frequency is set to a lower one when the start selection is made from the N-range to the D- or R-range while in other gear-shift controls each solenoid drive frequency is set to a higher one. Thus, the oil pressure vibration amplitude is originally small in the start selection, so that each solenoid drive frequency is set to a lower one to reduce the number of times the plunger and ball hit within the solenoid valve and hence, as shown in FIG. 12A reduce, sounds based on the solenoid operation (a SOL operation sound). Because the start selection is made in a low vehicle noise state where the normal vehicle speed is zero, a decrease in the solenoid operation sound makes it difficult to catch the sound as an abnormal one. Of course, vibrations of the clutch pressure (shown by L/C pressure in FIG. 12A) and the vibration amplitude of the output shaft torque (or vehicle) are small.

Figure 12B:
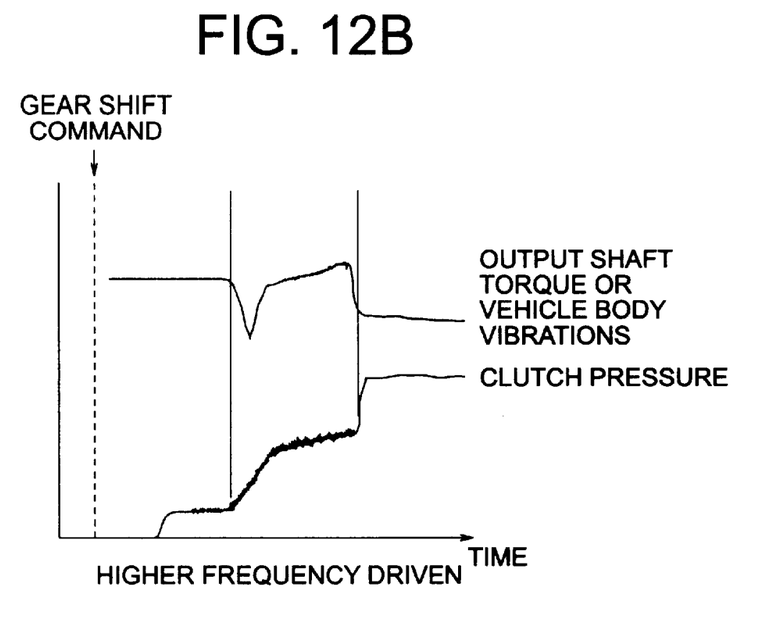
FIG. 12B shows another influence of operation of FIG. 7.

Conversely, during the normal travelling, engine noise and road noise enter the vehicle chambers, so that the solenoid operation sounds are not striking. On the other hand, since the duty cycle of each solenoid used or the oil pressure level is high, the oil pressure vibration amplitude is large. When the solenoid drive frequency is set to a higher one under such situation, fluctuations of the oil flow or changes in its flow speed produced when each solenoid is turned on/off decrease to thereby restrict the oil pressure vibrations conversely. FIG. 12B shows the output shaft torque or vehicle vibrations and the clutch pressure in the present embodiment obtained when an up-shift is selected during the normal travelling. It will be seen in FIG. 12B that the vibrations of the clutch oil pressure are restricted to small ones and the amplitudes of vibrations of the output shaft torque or vehicle are also restricted to small ones.

Figure 13:
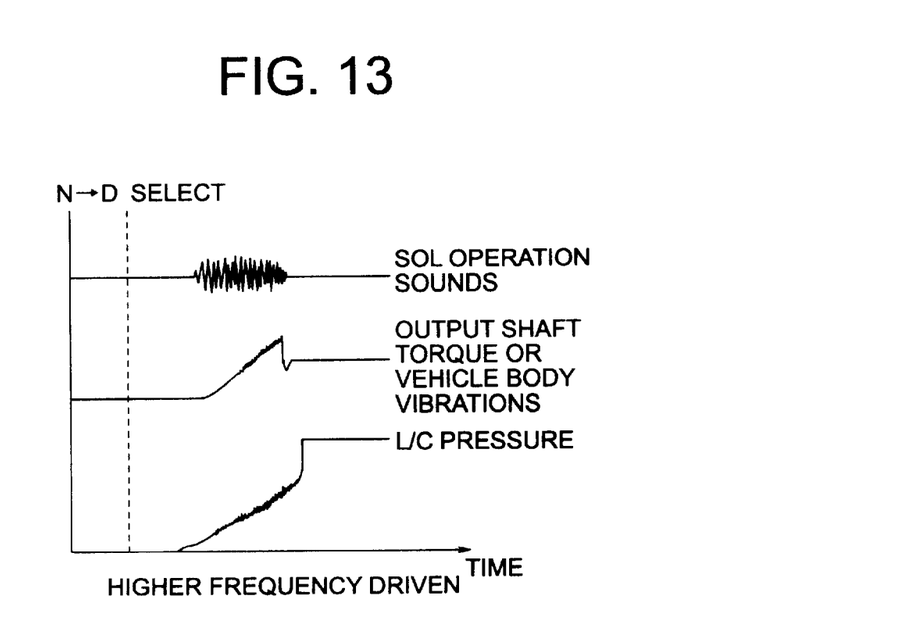
FIG. 13 shows a control of a case of FIG. 12A for the start selection.
Figure 14:
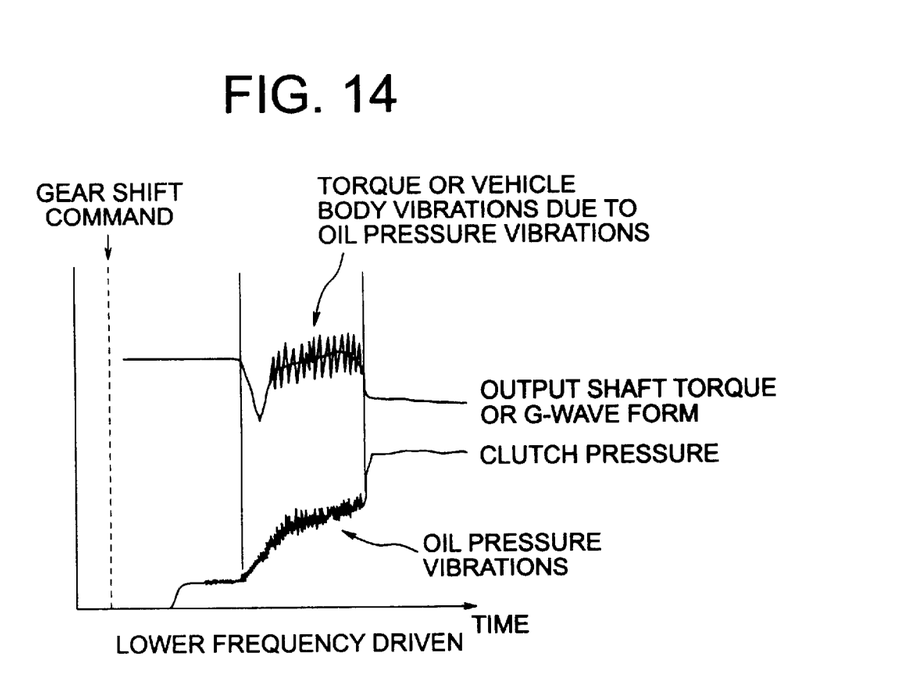
FIG. 14 shows a control of a case of FIG. 12B for gear shift in normal travelling.

In contrast, when the solenoid drive frequency is set, for example, to a higher frequency when the start selection is made, the solenoid operation sound is large although the amplitude of the vibrations of the clutch oil pressure, output shaft torque or vehicle is small as shown in FIG. 13. However, those vibrations are easily caught as abnormal sounds when vehicle noise is low, for example, when the vehicle speed is zero. In contrast, when the solenoid drive frequency in gear-shift control during normal travelling is set to a lower frequency, the effect of vibrations of the output oil pressure on the clutch pressure appears clearly, and simultaneously the amplitude of vibrations of the output shaft torque or vehicle is remarkably large, as shown in FIG. 14.

As will be obvious from the above, the select position switch 7 and the steps S45, S46 and S48 of the FIG. 7 process constitute the start selection detecting means of the controller for the automatic transmission according to the present invention. Similarly, the step S50 of the FIG. 7 process constitutes the solenoid valve drive frequency changing means.

While in the embodiments the respective control units are each illustrated as composed of a microcomputer, they are not limited to the microcomputers, but may be composed of a combination of electronic circuits such as operational circuits. The drive frequency may be decreased or increased stepwise to a target one, as requested.

As described above, according to the inventive controller for the automatic transmission, when the start selection is detected, the drive frequency of the PWM solenoid valve is changed to a frequency lower than the drive frequency employed in a gear shift while the vehicle is travelling. Thus, the number of times the plunger and ball hit each other within the solenoid valve and hence noise generated when the vehicle starts are reduced, and fluctuations or changes of the flow quantity and speed of the hydraulic oil while the vehicle is travelling are reduced to prevent generation of abnormal sounds and vibrations of the vehicle in the gear shift.

What is claimed is:

1. A controller for an automatic transmission for a vehicle comprising:

start selection detecting means for detecting that a start selection is made; and solenoid valve drive frequency changing means, responsive to said detecting means detecting that the start selection is made, for changing a drive frequency of a Pulse Wave Modulation (PWM) solenoid valve to a frequency lower than a drive frequency of the PWM solenoid valve used in gear shifting while the vehicle is travelling until at least a gear-shift is terminated.

2. The controller according to claim 1, wherein said start selection detecting means detects the range position of a shift lever adapted to be manipulated by a driver, and said start selection is to manipulate the shift lever to select a D range from a N range or a R range from the N range.

3. A controller for an automatic transmission for a vehicle comprising:

a start selection detector which detects that a start selection is made; and a solenoid valve drive frequency changing unit, responsive to said start selection detector that the start selection is made, which changes a drive frequency of a Pulse Wave Modulation (PWM) solenoid valve to a frequency lower than a drive frequency of the PWM solenoid valve used in gear shifting while the vehicle is travelling until at least a gear-shift is terminated.

4. The controller according to claim 3, wherein said start selection detector detects the range position of a shift lever adapted to be manipulated by a driver, and said start selection is to manipulate the shift lever to select a D range from a N range or a R range from the N range.

* * * * *